United States Patent
Becker et al.

(10) Patent No.: US 6,754,072 B2
(45) Date of Patent: Jun. 22, 2004

(54) PORTABLE DEVICE FOR COOLING A LAPTOP COMPUTER

(75) Inventors: Craig Henry Becker, Austin, TX (US); Jimmy Ming-Der Hsu, Austin, TX (US); Wayne Elmo Vicknair, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 09/961,958

(22) Filed: Sep. 24, 2001

(65) Prior Publication Data

US 2003/0058615 A1 Mar. 27, 2003

(51) Int. Cl.$^7$ ................................................. G06F 1/20
(52) U.S. Cl. .................... 361/687; 361/707; 165/80.4; 174/16.1
(58) Field of Search .............................. 361/687, 690, 361/694–695, 704, 707, 715; 454/184; 62/259.2; 165/80.2, 80.4, 185; 174/16.1, 16.3

(56) References Cited

U.S. PATENT DOCUMENTS

| | | | |
|---|---|---|---|
| 5,650,912 A | 7/1997 | Katsui et al. ................ 361/697 |
| 5,704,212 A * | 1/1998 | Erler et al. .................... 62/3.2 |
| 5,731,952 A | 3/1998 | Ohgami et al. .............. 361/687 |
| 5,748,444 A | 5/1998 | Honda et al. ................ 361/687 |
| 5,898,569 A | 4/1999 | Bhatia ........................ 361/700 |
| 5,936,836 A | 8/1999 | Scholder ...................... 361/695 |
| 5,964,279 A | 10/1999 | Mochizuki et al. ..... 165/104.33 |
| 5,966,286 A | 10/1999 | O'Connor et al. .......... 361/699 |
| 5,992,155 A * | 11/1999 | Kobayashi et al. ......... 361/687 |
| 6,034,870 A | 3/2000 | Osborn et al. .............. 361/690 |
| 6,038,128 A | 3/2000 | Hood, III et al. ........... 361/687 |
| 6,049,455 A | 4/2000 | Nakamura et al. .......... 361/688 |
| 6,058,009 A | 5/2000 | Hood, III et al. ........... 361/687 |
| 6,070,654 A | 6/2000 | Ito ......................... 165/104.26 |
| 6,094,347 A * | 7/2000 | Bhatia ........................ 361/695 |
| 6,098,952 A * | 8/2000 | Tonn .......................... 248/919 |
| 6,101,089 A | 8/2000 | Seto et al. ................... 361/687 |
| 6,115,252 A | 9/2000 | Ohta et al. .................. 361/700 |
| 6,134,104 A | 10/2000 | Mohi et al. ................. 361/683 |
| 6,141,214 A | 10/2000 | Ahn ........................... 361/687 |
| 6,166,906 A | 12/2000 | Sun et al. .................... 361/697 |
| 6,169,258 B1 * | 1/2001 | Roney et al. ................ 200/522 |
| 6,172,871 B1 | 1/2001 | Holung et al. .............. 361/687 |
| 6,174,205 B1 * | 1/2001 | Madsen et al. ............. 439/638 |
| 6,175,493 B1 | 1/2001 | Gold .......................... 361/687 |
| 6,181,553 B1 | 1/2001 | Cipolla et al. .............. 361/687 |
| 6,181,556 B1 | 1/2001 | Allman ....................... 361/690 |
| 6,205,025 B1 | 3/2001 | Chen .......................... 361/704 |
| 6,226,178 B1 | 5/2001 | Broder et al. ............... 361/687 |
| 6,227,286 B1 | 5/2001 | Katsui ....................... 165/80.3 |
| 6,407,911 B1 * | 6/2002 | Spence et al. .............. 361/683 |
| 6,487,668 B2 * | 11/2002 | Thomas et al. ............. 713/322 |

OTHER PUBLICATIONS http://www.roadtools.com/white.html, "Road Tools for all Laptops", Jul. 10, 2001, pp. 1–2.

* cited by examiner

*Primary Examiner*—Darren Schuberg
*Assistant Examiner*—Hung Van Duong
(74) *Attorney, Agent, or Firm*—Duke W. Yee; Jeffrey S. LaBaw; Wayne P. Bailey

(57) ABSTRACT

A heat sink provides a flat surface on which a portable computer can be placed and a finned surface for heat dissipation. An attached cushioning material protects a user from the finned surface, while micro-fans pull air through the space enclosed between the two materials. The fans are powered through the computer's universal serial bus (USB) and power management features reduce power drain from the portable.

23 Claims, 2 Drawing Sheets

PORTABLE DEVICE FOR COOLING A LAPTOP COMPUTER

BACKGROUND OF THE INVENTION

1. Technical Field

This invention relates generally to an accessory for a laptop computer; more specifically to a device to cool the lower surface of a laptop computer while making the use of the laptop more comfortable for the user.

2. Description of Related Art

Laptop computers are extremely popular for users who travel a lot or who need to take their computer to a work site. To enhance their portability, these computers are designed to be as lightweight as possible and to pack a large number of electronic devices into a relative small package.

Because of the density of electronics inside the laptop, a number of strategies have been used to provide adequate cooling to the components inside the computer, using heat pipes, radiator fins, and fans. However, for at least some models of laptop computers, the lower surface of the computer becomes quite hot during operation. If adequate ventilation to this surface is not provided, overheating of the internal components may result along with possible malfunction. Additionally, if the user is using the laptop on their lap, it becomes uncomfortable to continue working.

Several external devices have been implemented to either provide further cooling for the laptop or to insulate the user from the heat. To improve the comfort of the user, several products provide a barrier between the user and the computer while providing ventilation space underneath the laptop. The additional airflow can provide passive cooling for the computer, but no active cooling is performed.

Another external product adds directly to the cooling capacity of the laptop, by providing an additional fan which plugs into the Personal Computer Memory Card International Association (PCMCIA) socket. The fan draws power from the laptop and forces additional air into the case, which then flows out the vents normally provided. While this device does appear to improve the airflow through the computer, the specific layout of each laptop will determine how effective this fan can be at cooling. (One particular review of the PCMCIA fan-cooling device found that the laptop would stay cooler longer, but would still become uncomfortably hot during prolonged usage.) Additionally, such a device would take up one of the limited number of PCMCIA slots available to the user.

It would be advantageous to have a device that provided both comfort to the user and cooling to the internal components of the laptop, while not blocking the use of other features on the laptop.

SUMMARY OF THE INVENTION

This innovation provides a method and device for protecting a laptop user from excessive heat from the laptop, while at the same time providing additional cooling to the laptop itself. In one embodiment, a heat sink is sized to fit into a case shaped like an open box, with the heat sink closing the top the box. The heat-radiating surface of the heat sink sits within the case, while the opposite side is planar, so that a laptop computer can sit on it for cooling. Air inside the case is forced out the back by fans on this surface, while the front of the case (but preferably not the sides) has numerous air inlets to aid the flow of fresh air. Attached to the lower surface of the case is a thin layer of a cushioning material, providing both a soft surface and insulation from the heat sink. In at least some embodiments, a nonskid surface is formed on a portion of the planar surface of the heat sink, preferably near the edge. Preferably, the fans are powered through a Universal Serial Bus (USB) plug and preferably they are tied to smart power management logic.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
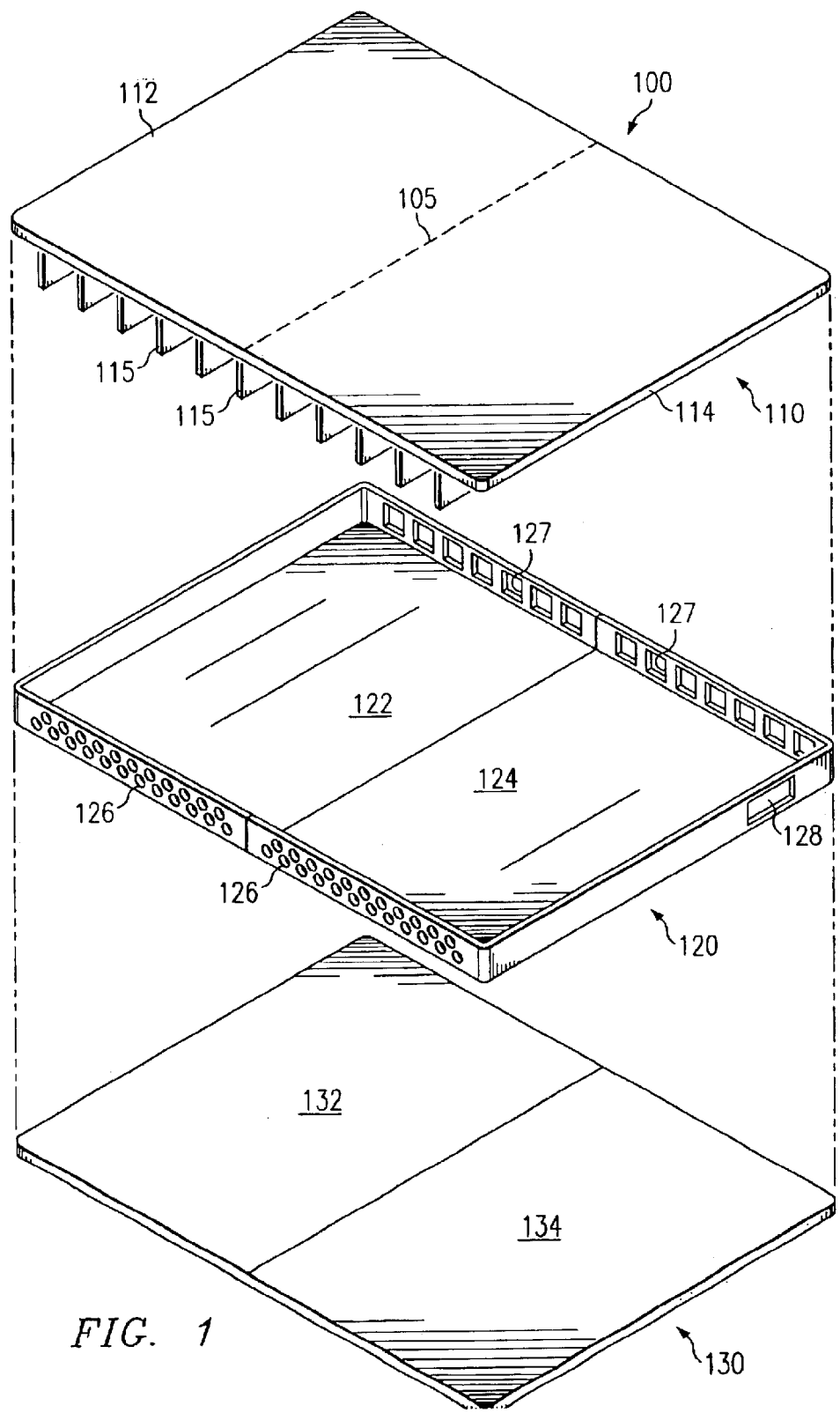
FIG. 1 depicts, prior to assembly, the major components of a cooling device in accordance with a preferred embodiment of the present invention.

With reference now to the figures and in particular with reference to FIG. 1, a pictorial representation of a cooling device in accordance with one embodiment of the invention is depicted. As shown, the three large components which form the body of device 100 are, from the top down, the heat sink 110, the case 120, and the cushion 130. Heat sink 110 has a flat upper surface 112, that is preferably sized to be slightly larger than the lower surface of a laptop computer, and a lower surface 114 on which are formed structures 115 for the dissipation of heat. A hinge 105, joins two halves of the heat sink, to allow folding of the assembled device. This will allow cooling device 100 to be stored in a smaller space for convenience when traveling. In the presently preferred embodiment, heat sink 110 is formed of aluminum, which is easy to clean, presents an attractive appearance, and has a low temperature resistance coefficient (0.0039 per degree C at 20 degrees C). The heat-dissipating structures 115 can be formed by stampings, extrusion, by fabrication and bonding, or by any of the other known methods. It is preferable that the flow of air over the heat sink be across the shorter dimension of the heat sink. This is to maximize the cooling effect, since there is less chance for air that has already picked up a heat load to continue traversing the heat sink. For this application, one needs to consider that a laptop computer in use is longer in a side to side direction than it is front to back. Therefore, for a heat sink which is to sit below the laptop, the air should preferably move from the front of the computer toward the back, away from the user, for the best results. It is further desirable that the heat sink itself be painted or anodized, as this enhances the radiation of heat, which can account for up to 25% of total heat dissipation in a natural convection environment. Additional considerations in designing the an appropriate heat sink include the operating temperature of the device to be cooled (i.e. the lower surface of the laptop), the ambient temperature (generally, room temperature), the existence or absence of a forced airflow (which this device has), and the volume of forced air (depending on the fans chosen). Further details on selecting a heat sink can be found in the article "How to Select a Heat Sink", Seri Lee, Aavid Thermal Technologies, ELECTRONICS COOLING MAGAZINE, Vol. 1, No. 1, which is hereby incorporated by reference.

The case 120 that contains and protects the heat sink is a shallow, open rectangular box, that is formed as two pieces 122 and 124 to accommodate folding. The material can be one of a large number of fairly sturdy, light materials, such as a plastic or lightweight metal. Along the front of the case are a number of apertures 126 to allow air to enter the case. Preferably, these apertures are only on the front on the case, to force air to traverse the entire heat sink before exiting. Although these apertures 126 are shown as circular holes, they need not be as shown, and can, for example, be vents or gratings which allow airflow but which provide some protection to the heat sink. Along the back of the case are seen apertures 127, where small fans will be placed to keep air moving through the case. Aperture 128, seen on the right side of the case, will provide access to the switch which controls the fans.

Cushion 130 is also in two pieces, 132 and 134, to allow folding of device 110. The cushion can be of one of many types of foam or of other materials which provide lightweight cushioning.

Figure 2:
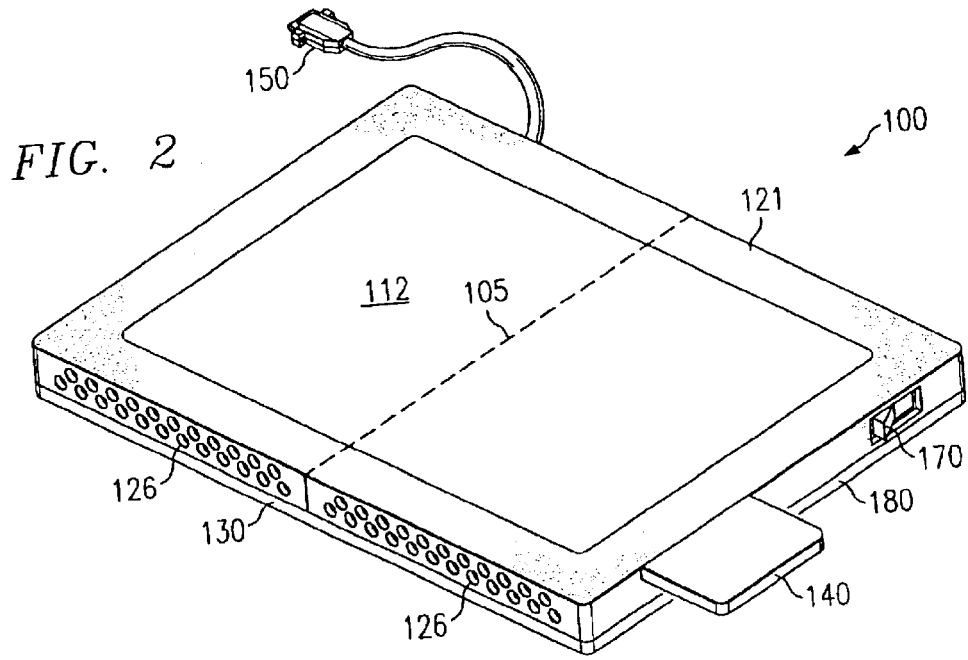
FIG. 2 depicts a cooling device in accordance with a preferred embodiment of the present invention.

With reference to FIG. 2, cooling device 100 is depicted after assembly. Top surface 112 preferably has a nonskid surface 121 applied near the edges to prevent slippage of the laptop computer. In this embodiment, an optional, small, slide-out tray 140 is formed as part of the case. This tray 140 can pull out and provide a surface for use with a mouse, yet slide into the case at other times. The fans are not seen in this drawing, although switch 170, which activates them, it shown on the side 180 of the device. Universal Serial Bus (USB) plug 150 powers the fans by plugging into the laptop computer's USB. The control of the fans will be further discussed below.

Figure 3:
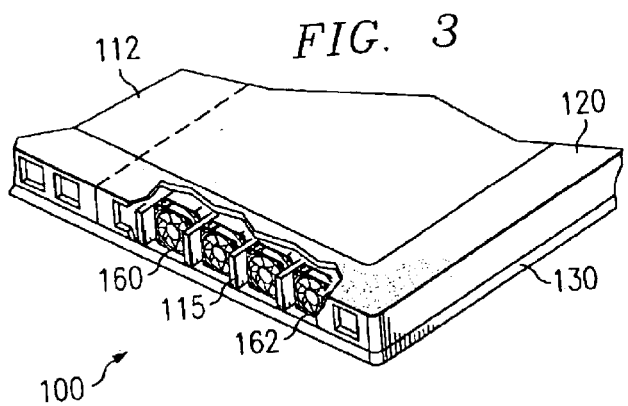
FIG. 3 depicts a cross-section through the cooling device of FIG. 1 in accordance with a preferred embodiment of the present invention.

With reference now to FIG. 3, a cutout is depicted into cooling device 100 of FIG. 2. In the presently preferred embodiment, the cooling structures 115 are formed into rows, so that there are well-defined channels, for the flow of air, formed between surface 114 and the lower surface of case 120 for the flow of air. At the end of these channels, micro-fans 160 and 162 pull or push air through the channel, depending of whether they are placed on the back or front of the channels.

In order to prevent excessive drain on the portable's power supply, the switch 170 for the fans can be set to three settings: "on", "off", and "auto". In the "auto" setting, a passive temperature sensor (not shown) monitors the temperature inside cooling device 100; when the temperature rises beyond a given point, micro-fans 160 and 162 are activated until the temperature once against drops. The temperature sensor can be very simple, such as a strip of metal which expands when heated to close a contact. Internal software for cooling device 100 can additionally detect other conditions when it would be desirable to turn the micro-fans 160 and 162 off to conserve energy, such as when the laptop enters a suspended state.

Figure 4:
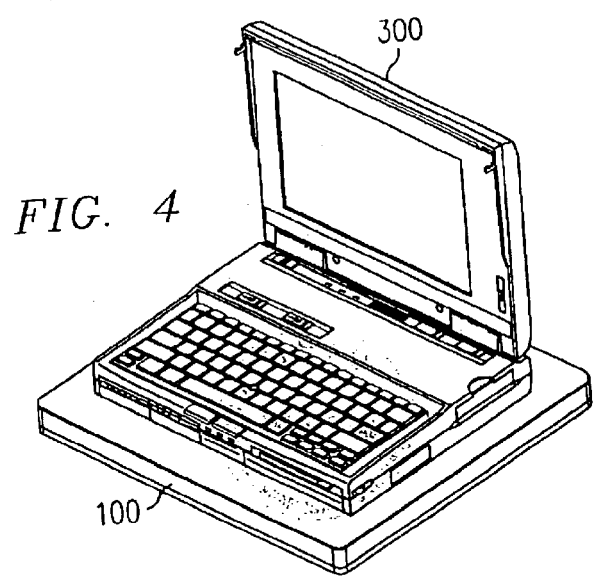
FIG. 4 depicts a cooling device being used with a laptop computer in accordance with a preferred embodiment of the present invention.

In the presently preferred embodiment, USB plug 150 is designed to act as a USB splitter. This feature avoids using up a USB port when cooling device 100 is in use, and increases the number of ports, rather than decreasing them. With reference to FIG. 4, cooling device 100 is depicted in use, with laptop computer 300 seen in side view. Unlike other products currently in use, no space is desirable between laptop computer 300 and cooling device 100, as the transfer of heat between the laptop and cooling device is increased by increased contact.

The cooling device of the present invention has been described in terms of a separate device, but in an alternate embodiment the device could be designed for permanent attachment to a portable computer, or the features could be incorporated into the design of a portable case. In this embodiment, the heat sink could cover essentially all of the lower surface of the portable computer or be configured to cover only those portions of the lower surface which are most likely to require additional cooling, such as near the battery or processor.

While it is possible to power the cooling device with a battery, this is not a preferred embodiment, as this can significantly increase the weight of the cooling device, making it less portable. However, as battery technology continues to progress, this may become a viable alternative.

Cooling device 100 can come in different sizes to suit different types or sizes of portable computers. It can also have different colors to fit different tastes. If desired, cushion 130 can have designs or logos, or a removable cover that can reflect the user's style, to improve marketability.

Cooling device 100, because of its hinged construction, will swing open along the hinge, so that the components can be cleaned. If additional access is deemed desirable, further access is easy to provide, e.g., by making the fit between the heat sink and the case a "snap" fit or using removable screws to fasten the two parts together.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A device for cooling a portable computer, said device comprising:
   a heat-conductive material having a first, flat surface which supports the portable computer and a multi-planed second surface configured for heat dissipation; and
   a case which encloses said multi-planed second surface of said conductive material but not said first surface, and further comprising a fan which forces air through said case and around and in contact with the multi-planes of said second surface of said heat-conductive material.

2. The device of claim 1, wherein said fan is powered by the power source of said portable computer and is connected to a power management package to control the use of power driving said fan.

3. The device of claim 1, further comprising a cushioning material attached to an external surface of said case which is opposite said first surface of said heat-conductive material.

4. The device of claim 1, wherein the device is foldable.

5. A device for cooling a portable computer, said device comprising:
   a heat-conductive material having a first, flat surface which supports the portable computer and a second surface configured for heat dissipation;
   a case which encloses said second surface of said conductive material but not said first surface;

a cushioning material attached to a surface of said case which is opposite said first surface of said heat-conductive material;

a fan which forces air through said case and around said second surface of said heat-conductive material; and a power source, connected to power said fan, wherein the device is foldable.

6. The device of claim 5, wherein said power source is the power source of the portable computer, which is contacted through a plug connected to the portable computer's universal serial bus.

7. The device of claim 5, further comprising a switch connected to control said fan.

8. The device of claim 5, further comprising a power management package to control the use of power driving said fan.

9. The device of claim 5, further comprising at least one additional fan.

10. The device of claim 5, further comprising a non-slip surface on at least a portion of said first surface.

11. The device of claim 5, wherein said second surface comprises a plurality of fins.

12. The device of claim 6, wherein said plug acts as a splitter for said universal serial bus.

13. The device of claim 7, wherein said switch comprises settings for "on", "off", and "automatic".

14. A device for cooling a portable computer, said device comprising:

a heat-conductive material having a first, flat surface which supports the portable computer and a second surface configured for heat dissipation;

a case which encloses said second surface of said conductive material but not said first surface;

a cushioning material attached to a surface of said case which is opposite said first surface of said heat-conductive material;

a fan which forces air through said case and around said second surface of said heat-conductive material;

a power source, connected to power said fan, wherein said non-slip surface is a rubberized edging on said flat surface; and a non-slip surface on at least a portion of said first surface, wherein said non-slip surface is a rubberized edging on said flat surface.

15. A device for cooling a portable computer, said device comprising:

a heat-conductive material having a first, flat surface which supports the portable computer and a second surface configured for heat dissipation;

a case which encloses said second surface of said conductive material but not said first surface;

a cushioning material attached to a surface of said case which is opposite said first surface of said heat-conductive material;

a fan which forces air through said case and around said second surface of said heat-conductive material;

a power source, connected to power said fan; and a mouse tray slideably attached to said device.

16. A device for cooling a portable computer, said device comprising:

cooling means for providing cooling for said portable computer; and cushioning means for cushioning and insulating a lower surface of said portable computer, wherein the device is foldable.

17. The device of claim 16, further comprising power means for powering portions of said cooling means.

18. The device of claim 16, further comprising power management means for controlling portions of said cooling means.

19. A portable computer, comprising:

a first case enclosing a first portion of said computer which is for the display of information;

a second case, attached to said first ease, enclosing a second portion of said computer which is for the input of information;

a heat sink having a first side attached adjacent said second portion of said computer and a multi-planed second side configured for heat dissipation;

a third case enclosing said second side of said heat sink;

a cushioning material attached to said third case; and a fan connected to circulate air around and in contact with the multi-planes of said second side of said heat sink.

20. The portable computer of claim 19, wherein said first side of said heat sink is adjacent substantially all of said second portion of said computer.

21. The portable computer of claim 19, wherein said heat sink covers only a portion of said lower surface of said second portion of said second case which is adjacent to a battery.

22. The portable computer of claim 19, wherein said second case is permanently attached to said third case.

23. The portable computer of claim 19, wherein said second case and said third case are the same.

* * * * *

UNITED STATES PATENT AND TRADEMARK OFFICE
CERTIFICATE OF CORRECTION

PATENT NO. : 6,754,072 B2
DATED : June 22, 2004
INVENTOR(S) : Becker et al.

It is certified that error appears in the above-identified patent and that said Letters Patent is hereby corrected as shown below:

Column 6,
Line 25, after "first" delete "ease" and insert -- case --.

Signed and Sealed this

Twenty-sixth Day of April, 2005

JON W. DUDAS
*Director of the United States Patent and Trademark Office*